United States Patent [19]
Higashiyama et al.

[11] Patent Number: 5,453,904
[45] Date of Patent: Sep. 26, 1995

[54] POWER CONTROL UNIT PROTECTION APPARATUS

[75] Inventors: Katsuhiko Higashiyama, Neyagawa; Taizou Oohama; Masahiko Mizoguchi, both of Hirakata; Tsunenari Nishikawa, Sakai, all of Japan

[73] Assignee: Matsushita Electric Industrial Co., Ltd., Osaka, Japan

[21] Appl. No.: 206,625

[22] Filed: Mar. 7, 1994

[30] Foreign Application Priority Data

Mar. 10, 1993 [JP] Japan .................................. 5-049212

[51] Int. Cl.$^6$ ............................................. H02H 3/08
[52] U.S. Cl. ...................... 361/103; 361/103; 323/285; 323/276
[58] Field of Search ............................ 361/37, 83, 103, 361/94, 98; 323/285, 276, 279, 907

[56] References Cited

U.S. PATENT DOCUMENTS 4,787,007 11/1988 Matsumura et al. ..................... 361/98

FOREIGN PATENT DOCUMENTS 59-11012 1/1984 Japan .
1-15161 3/1989 Japan .

OTHER PUBLICATIONS

English language Abstract of Japanese Laid-open Publication No. 59-11012.
English language Abstract of Japanese Laid-open Publication No. 1-15161.

Primary Examiner—A. D. Pellinen
Assistant Examiner—Michael Sherry
Attorney, Agent, or Firm—Sandler, Greenblum & Bernstein

[57] ABSTRACT

A power control unit protection apparatus is provided in association with a power control unit for controlling high or low power supply selectively to a loud speaker. The power control unit protection apparatus has an average current detector for detecting an average current supplied to a transformer, a temperature detector detecting the temperature of the transformer, and a timer. When the average current exceeds a predetermined level, and when the temperature rises above a predetermined temperature, timer starts to count a predetermined time. After the count, a cut off signal is produced to cut off the use of the high power supply from the power control unit. Thus, the power control unit protection apparatus prevents breakdown due to overheating of the power control unit including the power supply transformer by limiting the power supplied to the speaker.

4 Claims, 5 Drawing Sheets

POWER CONTROL UNIT PROTECTION APPARATUS

BACKGROUND OF THE INVENTION

1. Field of the Invention

The present invention relates to a power control unit protection apparatus for preventing thermal breakdown due to overheating of the power supply control unit, including the power supply transformer, by evaluating the load supply power loss (current) and amplifier power loss (temperature), and limiting the power supply after waiting a specified delay time.

2. Description of the Prior Art

Power control unit protection apparatuses provide an important protection function for power supply semiconductors and power supply transformers used in the power supply control field, and are available in many different forms.

Figure 5:
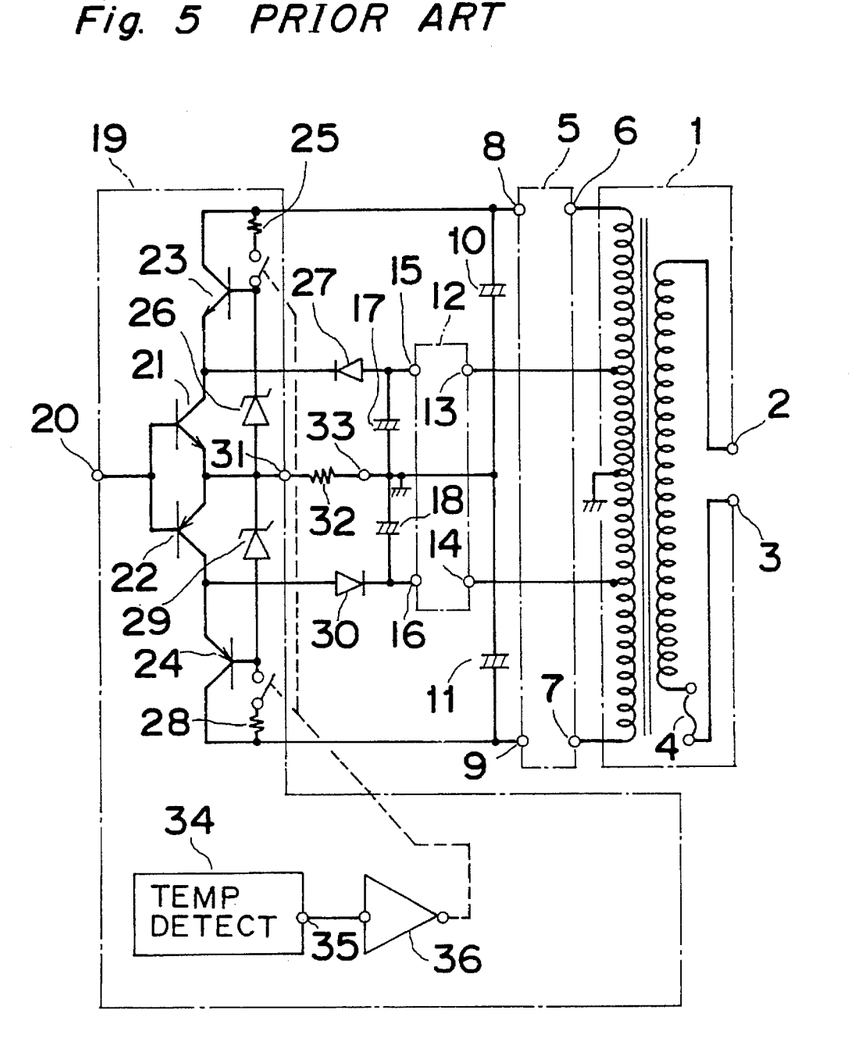
FIG. 5 is a basic circuit diagram of a conventional power control unit protection apparatus.

A conventional power control unit protection apparatus of this type is shown in FIG. 5 and described below with reference to the figures.

As shown in FIG. 5, this power control unit protection apparatus comprises a power supply transformer 1; a first input terminal 2 on the primary side of the power supply transformer 1; a second input terminal 3 on the primary side of the power supply transformer 1; a temperature fuse 4 built in to the power supply transformer 1; a high voltage rectifier 5; a first output terminal 6 at the high voltage tap of the power supply transformer 1; a second output terminal 7 at the high voltage tap of the power supply transformer 1; a positive output terminal 8 to the high voltage rectifier 5; a negative output terminal 9 to the high voltage rectifier 5; a positive high voltage rectification capacitor 10; a negative high voltage rectification capacitor 11; a low voltage rectifier 12; a first output terminal 13 at the low voltage tap of the power supply transformer 1; a second output terminal 14 at the low voltage tap of the power supply transformer 1; a positive output terminal 15 to the low voltage rectifier 12; a negative output terminal 16 to the low voltage rectifier 12; a positive low voltage rectification capacitor 17; a negative low voltage rectification capacitor 18; a dual power supply switching controller 19; a dual power supply switching controller signal input terminal 20; complementary output transistors 21 and 22; a positive high voltage power supply control output transistor 23; a negative high voltage power supply control output transistor 24; a resistor 25 and Zener diode 26 for generating the bias current of the positive high voltage power supply control output transistor 23; a positive switching diode 27; a resistor 28 and Zener diode 29 for generating the bias current of the negative high voltage power supply control output transistor 24; a negative switching diode 30; an output terminal 31; a load resistor 32 such as a speaker; a ground terminal 33; a dual power supply switching controller temperature detector 34; a temperature detector output terminal 35; and a high voltage power supply interrupt controller 36.

The power control unit protection apparatus thus comprised operates as follows.

Figure 6:
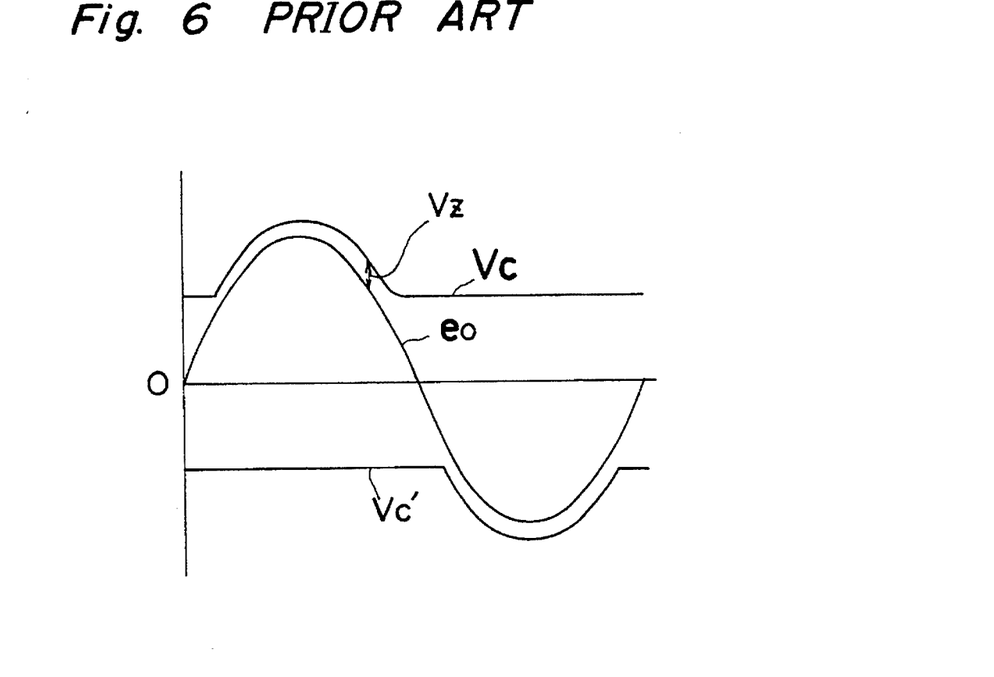
FIG. 6 is a wave form diagram used to describe the basic operation of the conventional power control unit protection apparatus.

When an input signal is applied to the dual power supply switching controller signal input terminal 20, the complementary output transistors 21 and 22 operate as emitter followers, and the voltage at the output terminal 31 is approximately equal to the input. When the absolute value of the output voltage is sufficiently lower than the positive output terminal 15 voltage, the current flowing to the speaker 32 passes in the positive half cycle through the positive output terminal 15 of the low voltage rectifier, the positive switching diode 27, output transistor 21, and to the speaker 32. When the absolute value of the output voltage is greater than the positive output terminal 15 voltage, the current flowing to the speaker 32 passes in the positive half cycle through the positive output terminal 8 of the high voltage rectifier, the positive high voltage power supply control output transistor 23, output transistor 21, and to the speaker 32. The wave form at this time is shown in FIG. 6.

The difference between the output voltage $e_0$ at the output terminal and the collector voltages Vc and Vc' of the transistors 21 and 22 is the voltage drop at the biasing Zener diodes 26 and 29 (FIG. 5) if the base emitter voltage $V_{BE}$ of transistors 23 and 24 is ignored, and a bias voltage is constantly applied so that the non-linear (saturation) range of the output transistor 21 is not used.

When the absolute value of the output voltage at the output terminal 31 is sufficiently lower than the low voltage rectifier output terminal 15, the power supply from the power supply transformer 1 to the dual power supply switching controller operating as described above is supplied through the first and second output terminals 13 and 14 on the low voltage tap of the power supply transformer 1. When the absolute value of the output voltage is greater than the positive output terminal 15 voltage, power is supplied through the first and second output terminals 6 and 7 on the high voltage tap of the power supply transformer 1.

Figure 7:
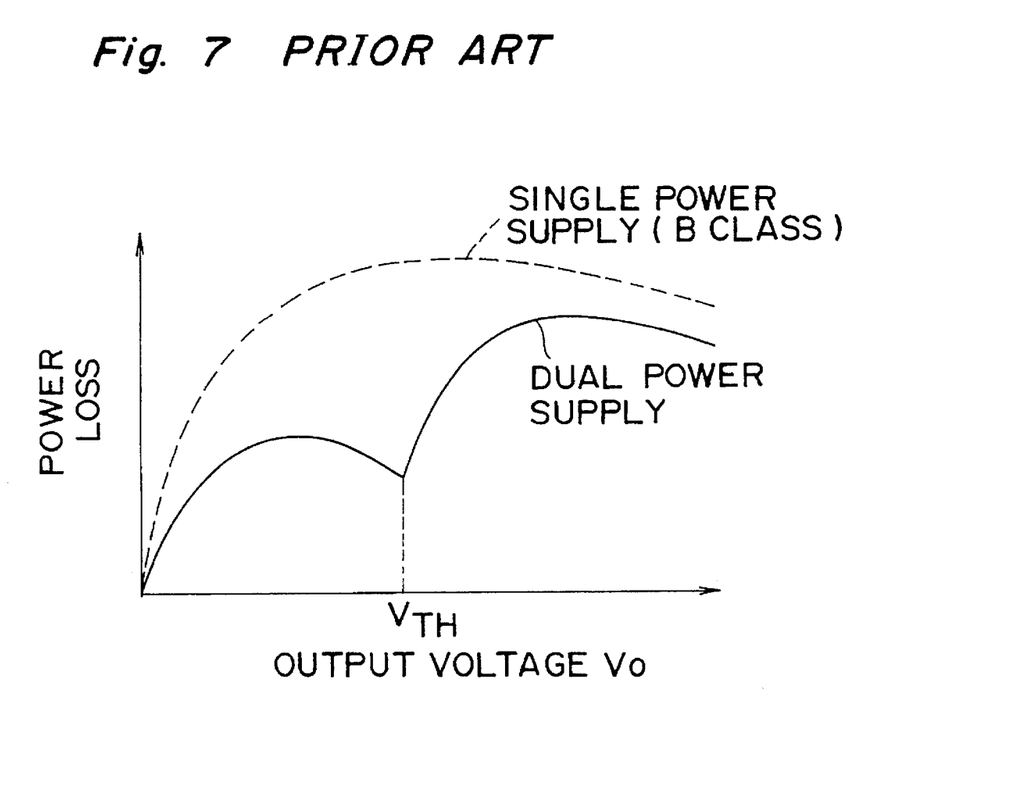
FIG. 7 is a graph of the power loss characteristic of the conventional power control unit protection apparatus.

The power supply loss characteristic of a typical dual power supply switching controller is shown in FIG. 7, wherein the output voltage amplitude appearing at the output terminal 31 is plotted on the X axis, and the combined power loss values of the dual power supply switching controller transistors 21 and 23 (22, 24) are plotted on the Y axis. VTH in FIG. 7 indicates the voltage point at which the absolute value of the output voltage exceeds the voltage of the low voltage rectifier output terminal 15.

The dotted line curve in FIG. 7 indicates the power loss when using a single power supply controller, i.e., there is no power supply from terminals 15 and 16 in FIG. 5 and power is supplied only from terminals 8 and 9.

As will be known from FIG. 7, power loss with a dual power supply switching controller is less at all amplitude levels than the power loss with a single power supply controller (known as a Class B controller). In other words, more efficient power control is possible using a dual power supply switching controller. Efficiency is particularly high when the power supply is input from a low voltage rectifier output terminal, making it possible to supply power using a power supply transformer with a smaller core than a power supply transformer feeding a single power supply controller.

When the dual power supply switching controller temperature detector 34, which detects the average power loss (temperature) of the dual power supply switching controller 19, detects the specified temperature, the high voltage power supply interrupt controller 36 operates to shut off the high voltage power supply control output transistors 23 and 24, thereby protecting against excessive power loss in the power supply controller.

However, while the conventional power control unit protection apparatus described above enables temperature protection of the dual power supply switching controller, there is no effective means of providing similar temperature protection to the power supply transformer. The problem here is that the power loss of the dual power supply switching controller is not proportional to the load power loss. As a result, reducing the size of the power supply transformer designed for maximum efficiency in the dual power supply switching controller is made difficult due to internal damage to the power supply transformer, typically blowing the temperature fuse 4, if the power supply is maintained for a certain period during an excessive load power loss state.

SUMMARY OF THE INVENTION

Therefore, an object of the present invention is to provide a power control unit protection apparatus for a power supply controller comprising a power supply transformer whereby damage due to overheating of the power supply controller containing the power supply transformer is prevented by examining the total power supply level by means of evaluating the output of an average output current detector, which detects the output current of the high voltage power supply control output transistor to measure the load power loss, and the average power loss (temperature) of the dual power supply switching controller; setting a specified delay time to predict and estimate temperature rise of the power supply transformer; and operating the high voltage power supply interrupt controller.

To achieve this object, a power control unit protection apparatus according to the present invention for controlling power supply to a load, comprises: a power supply transformer having at least first level power supply terminals and a second level power supply terminals; first power supply switching means for supplying relatively low power to said load from said first level power supply terminals; second power supply switching means for supplying relatively high power to said load from said second level power supply terminals; average current detection means for detecting an average current passing through said second level power supply terminals, and for producing an overflow signal when said average current exceeds a predetermined level; temperature detection means for detecting a temperature of said power supply transformer and for producing an overheat signal when the detected temperature exceeds a first predetermined threshold temperature; AND gate means for producing an enable signal upon receipt of said overflow signal and said overheat signal; timer means for counting a predetermined time in response to said enable signal, and for producing a cut off signal after the count up; power supply interrupt means for cutting off said second power supply switching means in response to said cut off signal.

By means of this configuration, the power supplied to the load, e.g., speaker, is monitored by the load current detector comprising an integral voltage comparator, which operates when the average current of the high voltage power supply control transistor in the plural power supply switching controller exceeds a specified current value. By detecting the temperature generated by the plural power supply switching controller, the average power loss of the plural power supply switching controller is also monitored. When both of these sensors produces HIGH level signals, an overcurrent is being supplied from the power supply transformer.

The temperature rise of the power supply transformer is generally a function of the volume of the transformer core (a magnetic body) and the power loss, and may vary widely. Thus, if it is possible to set the time (period) which the minimum required overcurrent can be supplied to the load, it is also possible to control the temperature rise of the power supply transformer. By thus providing an AND operator that outputs HIGH level signal only when both of the above detector output terminals are HIGH, to a timer controller that can set a predetermined delay time, and the high voltage power supply interrupt controller operates to limit the power supplied to the load to the power supplied from the low voltage tap when an overcurrent is applied continuously for a predetermined period to the dual power supply controller and load. If the ratio between the high voltage power supply tap and the low voltage power supply tap ranges from ½ to ⅔, power loss can be significantly reduced to less than half compared with the conventional configuration because the approximate power loss is proportional to the square of the voltage. The temperature rise of the power supply transformer is thus greatly alleviated, and the power supply can be maintained without the internal temperature fuse blowing.

Furthermore, if it is also possible to reset the high voltage power supply interrupt controller and timer controller when the temperature generated by the plural power supply switching controller drops below the predetermined temperature setting, a normal power supply can be restored to the load. It is thus possible to prevent overheating of a power supply controller comprising a plural power supply tap power supply transformer and plural power supply switching controller.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiment of a power control unit protection apparatus according to the present invention is described below with reference to FIG. 1, a basic circuit diagram of this power control unit protection apparatus.

Figure 1:
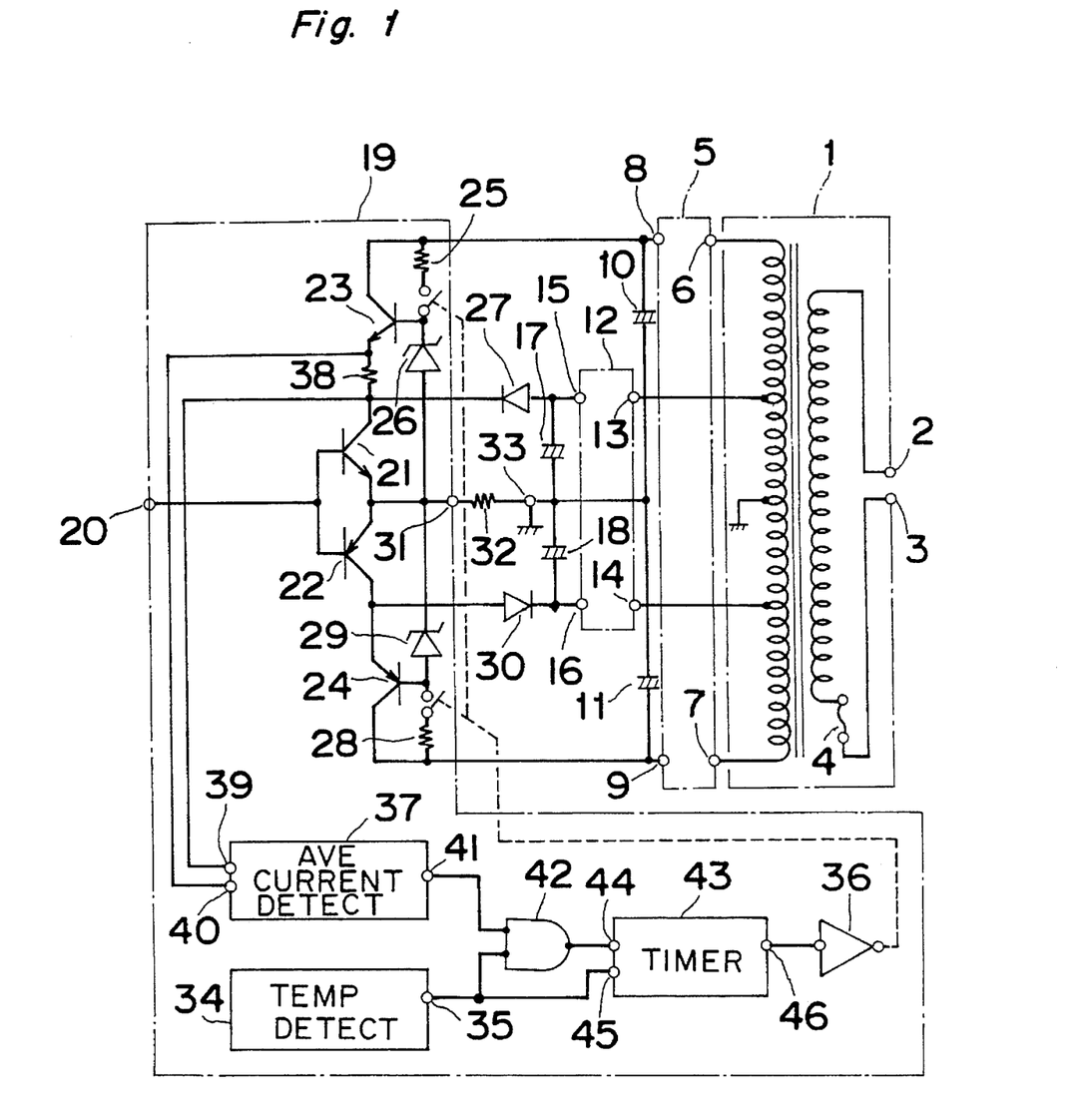
FIG. 1 is a basic circuit diagram of a power control unit protection apparatus according to the preferred embodiment of the invention.

As shown in FIG. 1, this power control unit protection apparatus comprises a power supply transformer 1; a first input terminal 2 on the primary side of the power supply transformer 1; a second input terminal 3 on the primary side of the power supply transformer 1; a temperature fuse 4 built in to the power supply transformer 1; a high voltage rectifier 5; a first output terminal 6 at the high voltage tap of the power supply transformer 1; a second output terminal 7 at the high voltage tap of the power supply transformer 1; a positive output terminal 8 to the high voltage rectifier 5; a negative output terminal 9 to the high voltage rectifier 5; a positive high voltage rectification capacitor 10; a negative high voltage rectification capacitor 11; a low voltage rectifier 12; a first output terminal 13 at the low voltage tap of the power supply transformer 1; a second output terminal 14 at the low voltage tap of the power supply transformer 1; a positive output terminal 15 to the low voltage rectifier 12; a negative output terminal 16 to the low voltage rectifier 12; a positive low voltage rectification capacitor 17; a negative low voltage rectification capacitor 18; a dual power supply switching controller 19; a dual power supply switching controller signal input terminal 20; complementary output transistors 21 and 22; a positive high voltage power supply control output transistor 23; a negative high voltage power supply control output transistor 24; a resistor 25 and Zener diode 26 for generating the bias current of the positive high voltage power supply control output transistor 23; a positive switching diode 27; a resistor 28 and Zener diode 29 for generating the bias current of the negative high voltage power supply control output transistor 24; a negative switching diode 30; an output terminal 31; a load, such as a loud speaker, 32; and a ground terminal 33.

The invention further comprises a temperature detector 34 for detecting the average power loss (temperature) of the dual power supply switching controller 19; temperature detector output terminal 35; a high voltage power supply interrupt controller 36 for controlling ON and OFF of power transistors 23 and 24 simultaneously; an average current detector 37 for the high voltage power supply control transistor for detecting the average value of the current supplied to the speaker 32; a current detection resistor 38 for the high voltage power supply control transistor; a first current detection terminal 39 for the high voltage power supply control transistor; a second current detection terminal 40 for the high voltage power supply control transistor; an average current detector output terminal 41 for the high voltage power supply control transistor; an AND detector 42; a timer 43 for counting a predetermined time, such as ten minutes; a timer controller set terminal 44; a timer controller reset terminal 45; and a timer controller output terminal 46.

The operation of a power control unit protection apparatus thus comprised is described below.

According to one embodiment, the circuit shown in FIG. 1 is installed inside a speaker box (not shown).

When an audio signal is applied to input terminal 20, the complementary output transistors 21 and 22 operate as emitter followers, and the voltage at the output terminal 31 is approximately equal to the input. When the absolute value of the output voltage is sufficiently lower than the low voltage rectifier output terminal 15 voltage, the current flowing to the speaker 32 passes in the positive half cycle through the positive output terminal 15 of the low voltage rectifier, the positive switching diode 27, output transistor 21, and to the speaker 32. When the absolute value of the output voltage is greater than the low voltage rectifier output terminal 15 voltage, the current flowing to the speaker 32 passes in the positive half cycle through the positive output terminal 8 of the high voltage rectifier, the positive high voltage power supply control output transistor 23, output transistor 21, and to the speaker 32. The wave form at this time is shown in FIG. 6, in which Vc shows collector voltage of transistor 21, Vc' shows collector voltage of transistor 22.

A voltage difference Vz between the output voltage $e_0$ at terminal 31 and the collector voltage Vc of the transistor 21 is approximately equal to the voltage drop at the biasing Zener diode 26 (FIG. 1), and a bias voltage is constantly applied so that the non-linear (saturation) range of the output transistor 21 is not used. Similarly, a voltage difference Vz between the output voltage $e_0$ at terminal 31 and the collector voltage Vc' of the transistor 22 is approximately equal to the voltage drop at the biasing Zener diode 29 (FIG. 1), and a bias voltage is constantly applied so that the non-linear (saturation) range of the output transistor 22 is not used.

When the absolute value of the output voltage is sufficiently lower than the voltage of the low voltage rectifier output terminal 15, the power supply from the power supply transformer 1 to the dual power supply switching controller operating as described above is supplied through the first and second output terminals 13 and 14 on the low voltage tap of the power supply transformer 1. When the absolute value of the output voltage is greater than the voltage of the low voltage rectifier output terminal 15, power is supplied through the first and second output terminals 6 and 7 on the high voltage tap of the power supply transformer 1.

The power supply loss characteristic of the dual power supply switching controller is shown in FIG. 7, wherein the output voltage amplitude appearing at the output terminal 31 is plotted on the X axis, and the combined power loss values of the dual power supply switching controller transistors 21 and 23 (or 22 and 24) are plotted on the Y axis. VTH in FIG. 7 indicates the voltage point at which the absolute value of the output voltage exceeds the voltage of the low voltage rectifier output terminal 15. The curve shown by a dotted line represents the power loss value of the single power supply (B class) in which the power is supplied by only one voltage rectifier 5 or 12.

As apparent from FIG. 7, power loss with a dual power supply switching controller is less at all amplitude levels than the power loss with a single power supply controller. In other words, more efficient power control is possible. Efficiency is particularly high when the power supply is input from a low voltage rectifier output terminal, making it possible to supply power using a power supply transformer with a smaller core than a power supply transformer feeding a single power supply controller.

Figure 3:
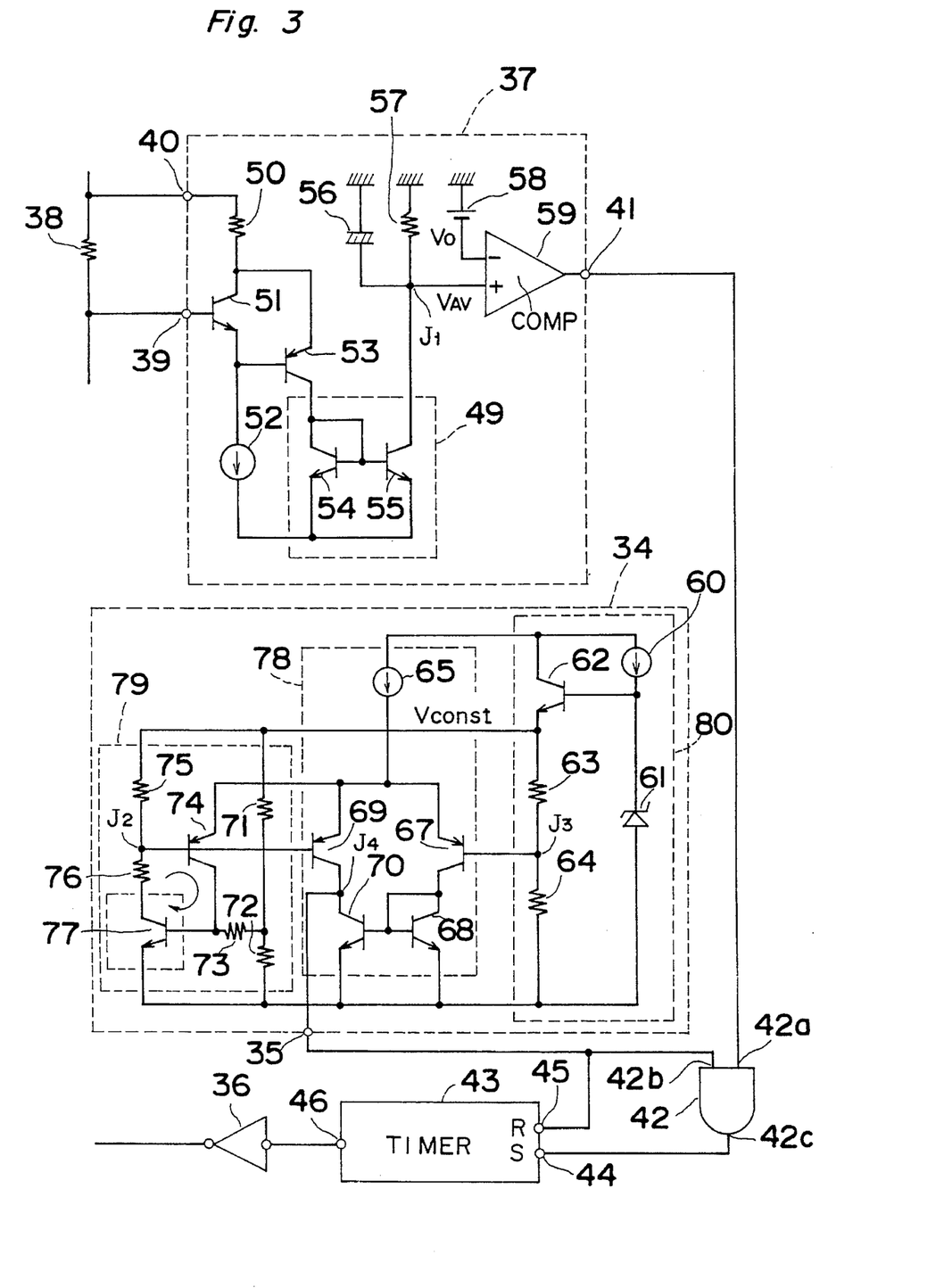
FIG. 3 is a circuit diagram showing a detail of the average current detector and temperature detector shown in FIG. 1.

Referring to FIG. 3, the average current detector 37 has terminals 39 and 40 connected across the current detection resistor 38. Transistors 51 and 53, a resistor 50 and a constant current source 52 are provided to produce from the collector of transistor 53 a current proportional to the current flowing through resistor 38. Transistors 54 and 55 define a current mirror 49. Thus, the current proportional to the current flowing through the resistor 38 is also produced from the collector of transistor 55. The current from transistor 55 is accumulated in a capacitor 56 at a predetermined time constant defined by resistor 57. Thus, the voltage produced from capacitor 56 represents the average current flowing through resistor 38, averaged by the time determined by the time constant. The average voltage Vav at junction J1 is applied to comparator 59, which also receives a predetermined constant voltage Vo from a constant voltage source 58. When the average voltage Vav exceeds a predetermined constant voltage Vo, i.e., when the average current at resistor 38 exceeds a predetermined level, the comparator 59 produces a HIGH level signal through output terminal 41.

The temperature detector 34 has a constant voltage generator 80, a differential amplifier 78 and a hysteresis circuit 79.

The constant voltage generator 80 is defined by a constant current source 60, zener diode 61, transistor 62 and resistors 63 and 64. Thus, a constant voltage is produced at a junction J3.

The differential amplifier 78 is defined by a constant current source 65 and transistors 67, 68, 69 and 70. The base voltages Vb69 and Vb67 at the bases of transistors 67 and 69, respectively, are compared in the differential amplifier 78. A junction J4 produces a HIGH level signal when Vb69<Vb67 and the junction J4 produces a LOW level signal when Vb69>Vb67.

The hysteresis circuit 79 is defined by a temperature detection transistor 77 a positive feedback transistor 74 and resistors 71, 72, 73, 75 and 76. The temperature detection transistor 77 changes its base-emitter voltage relatively to the temperature, and serves as a temperature detection element. The positive feedback transistor 74, when it is turned on, provides a positive feedback current to the base of the transistor 77. At least the temperature detection transistor 77 is physically connected to a heat releasing fin or plate (not shown) of the circuit shown in FIG. 1 so that the transistor 77 will be the same temperature as the power transformer and its associated circuits. According to the preferred embodiment, all the circuit elements, including transistor 77, in the temperature detector 34 are formed in an IC chip, and is connected to the heat releasing fin.

Figure 4:
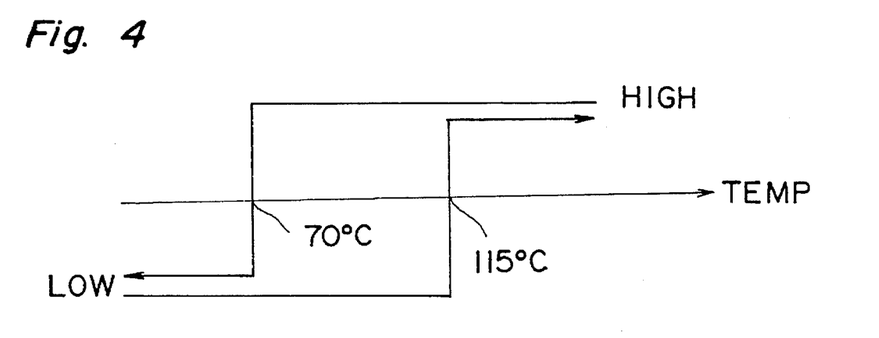
FIG. 4 is a graph showing hysteresis characteristics of the temperature detector of FIG. 3.

In operation, as the temperature of the circuit shown in FIG. 1 (referred to as a circuit temperature) rises from a room temperature to a high temperature, such as above 115° C., the transistor 77 changes its state from on to off in a hysteresis pattern shown in FIG. 4.

More specifically, at first when the circuit temperature is less than an upper threshold 115° C., such as 70° C., transistor 77 is disabled and maintained off. Thus, a HIGH level signal is observed at junction J2. Thus, transistors 74 and 69 are turned off. Thus, Vb69>Vb67 is obtained, and a LOW level signal is observed at junction J4, and the LOW level signal is produced from terminal 35.

When the circuit temperature exceeds the upper threshold 115° C., such as to 116° C., transistor 77 turns on to make the voltage level at junction J2 LOW. Thus, transistors 74 and 69 turn on. By the turn on of transistor 74, a positive feedback is formed by an arrow shown in FIG. 3 to give a HIGH voltage to the base of transistor 77, thereby maintaining the transistor 77 on. Thus, Vb69<Vb67 is obtained, and a HIGH level signal is observed at junction J4, and the HIGH level signal, which is an overheat signal, is produced from terminal 35.

Thereafter, when the circuit temperature falls to a temperature between upper and lower thresholds, e.g., 70° C. and 115° C., transistor 77 still continues to be in on state by a sum voltage of the positive feedback voltage added to the voltage determined by resistors 72 and 73, applied to the base of the transistor 77. Thus, the terminal 35 continues to produce the HIGH level signal, i.e., the overheat signal.

Thereafter, when the circuit temperature falls below the lower threshold, 70° C., the base-emitter voltage Vbe of transistor 77 increases greater than said sum voltage to turn off the transistor 77. Thus, a HIGH level signal is observed at junction J2. Thus, transistors 74 and 69 are turned off, and, a LOW level signal is observed at junction J4, thereby producing a LOW level signal from terminal 35.

Next, the overall operation of the circuit of FIG. 3 is described. When the circuit temperature is below the lower threshold, 70° C., LOW level signals are applied to the inputs 42a and 42b of AND gate 42. Thus, the output 42c of AND gate 42 produces a LOW level signal.

Then, when the speaker is over powered, the average current through resistor 38 becomes very high to produce a HIGH level signal from comparator 59. When this state continues for a while, the circuit temperature exceeds the upper threshold, 115° C., so that the temperature detector 34 produces a HIGH level overheat signal. At this point, AND gate 42 produces a HIGH level signal which is applied to the set terminal 44 of the timer 43. Then, by the overheat signal, timer 43 starts to count a predetermined time, such as 10 minutes, which is the maximum waiting time before the circuit of FIG. 1 becomes out of order by high temperature, i.e., the maximum time the minimum overcurrent required by this power supply control system can be supplied to the load. A setting in the range 10–30 minutes was demonstrated effective in tests. When the predetermined time is counted, timer 43 produces from it output 46 a HIGH level signal which is applied to the high voltage power supply interrupt controller 36 to turn off the power transistors 23 and 24. Thus, the speaker 32, which has been operated at high power from the voltage rectifier 5 is now operated at low power from the voltage rectifier 12.

When the power transistors 23 and 24 are turned off, the average current at resistor 38 is reduced to produce a LOW level signal from comparator 59. Thus, AND gate 42 produces a LOW level signal. At this time, nothing happens in timer 43.

Thereafter, when the circuit temperature is reduced below the lower threshold, 70° C., a LOW level signal is produced from output terminal 35, and is applied to the reset terminal 45 of timer 43. Thus, timer 43 produces a LOW level signal which causes the high voltage power supply interrupt controller 36 to turn on the power transistor 23 and 24. Thus, the speaker 32 again starts to operate at high power.

The thermal time constant of temperature rise in the dual power supply switching controller is assumed below to be sufficiently short relative to the thermal time constant of the power supply transformer temperature rise.

If the ratio between the high voltage power supply tap and the low voltage power supply tap ranges from ½ to ⅔, power loss can be significantly reduced to less than half compared with the conventional configuration because the approximate power loss is proportional to the square of the voltage. The temperature rise of the power supply transformer 1 is thus greatly alleviated, and the power supply can be maintained without the internal temperature fuse blowing.

It is thus possible to prevent overheating of a power supply controller comprising a dual power supply tap power supply transformer 1 and dual power supply switching controller 19.

Figure 2:
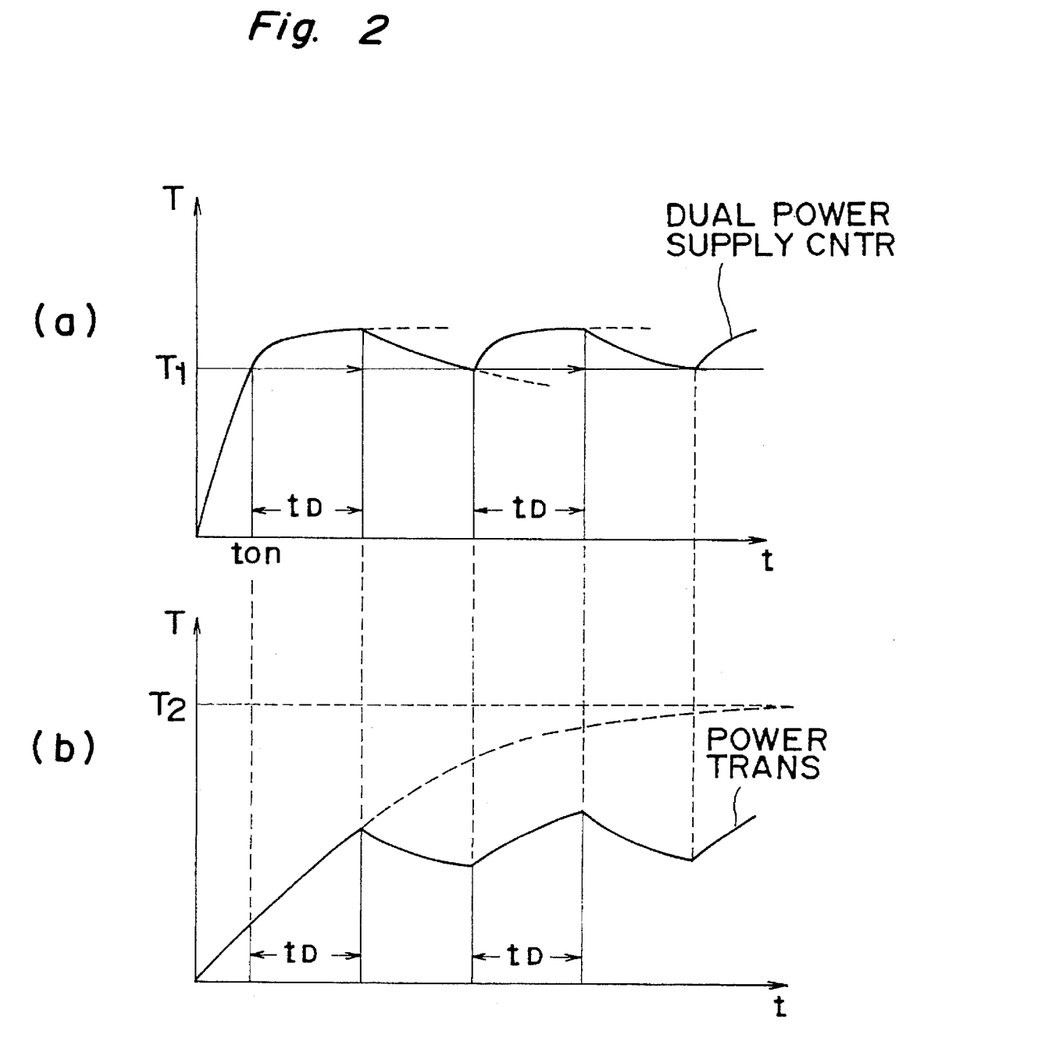
FIG. 2 shows temperature risegraphs (a) and (b) of the power control unit protection apparatus according to the preferred embodiment of the invention.

FIG. 2 shows graphs (a) and (b) of the change in temperature over time during a normal operating sequence. In FIG. 2, graph (a), the temperature T of the dual power supply switching controller 19 is shown on the Y axis with T1 being the temperature of the dual power supply switching controller temperature detector 34 at time $t_{on}$ at which the output terminal of the AND detector 42 becomes HIGH; time $T_D$ is the delay time of the timer controller 43. In FIG. 2 (b), the temperature T of the power supply transformer 1 is shown on the Y axis with T2 being the break (threshold) temperature of the temperature fuse built in to the power supply transformer.

It is to be noted that while the invention has been described above with reference to a power supply transformer having dual power supply taps, the invention can be similarly operated when adapted to power supply transformers having three or more power supply taps as may be required by the control application.

It is therefore possible to achieve a control technology making it possible to greatly reduce the size of the power supply transformer by providing an AND detector operating with the average current detector output of a high voltage power supply control transistor and the average power loss detector output of a plural power supply switching amplifier, a timer controller for setting a predetermined delay time, and a high voltage power supply interrupt controller in a plural power supply switching amplifier. Potential applications for this technology can be found throughout the power supply field.

The invention being thus described, it will be obvious that the same may be varied in many ways. Such variations are not to be regarded as a departure from the spirit and scope Of the invention, and all such modifications as would be obvious to one skilled in the art are intended to be included within the scope of the following claims.

What is claimed is:

1. A power control unit protection apparatus for controlling power supply to a lead, comprising:

a power supply transformer having at least first level power supply terminals and second level power supply terminals;

first power supply switching means for supplying relatively low power to said load from said first level power supply terminals;

second power supply switching means for supplying relatively high power to said load from said second level power supply terminals;

average current detection means for detecting an average current passing through said second level power supply terminals, and for producing a first high level signal when said average current exceeds a predetermined level;

temperature detection means for detecting a temperature of said second power supply switching means and for producing an overheat signal when the detected temperature exceeds a first predetermined threshold temperature;

AND gate means for producing a second high level signal upon receipt of said first high level signal and said overheat signal;

timer means for counting a predetermined time in response to said second high level signal, and for producing a third high level signal after the count up;

power supply interrupt means for cutting off said second power supply switching means in response to said third high level signal.

2. A power control unit protection apparatus as claimed in claim 1, wherein said temperature detection means produces a first low level signal when the detected temperature falls below a second predetermined threshold temperature which is lower than said first predetermined threshold temperature.

3. A power control unit protection apparatus as claimed in claim 2, wherein said timer means produces a second low level signal in response to said first low level signal, and wherein said power supply interrupt means turns said second power supply switching means on in response to said second low level signal.

4. A power control unit protection apparatus as claimed in claim 1, wherein said temperature detection means comprises a transistor for detecting an average power loss.

* * * * *